G. W. KUENNETH.
BRAKING DEVICE.
APPLICATION FILED OCT. 6, 1916.
1,386,120.
Patented Aug. 2, 1921.
3 SHEETS—SHEET 3.
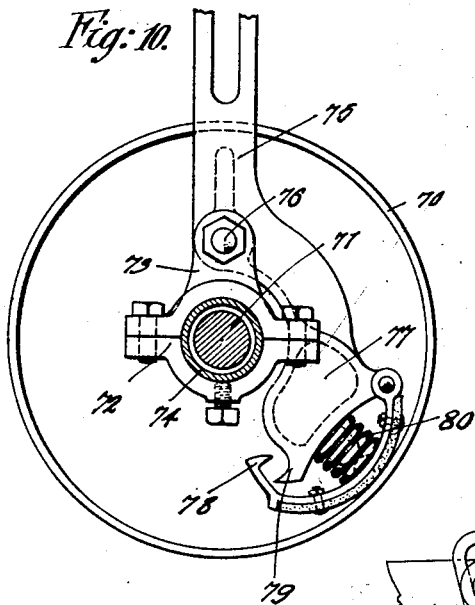
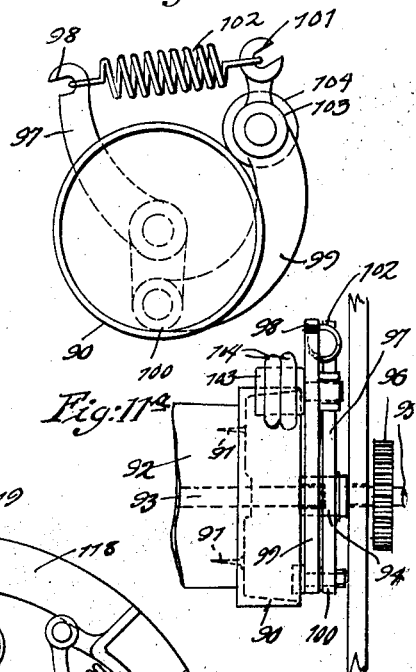
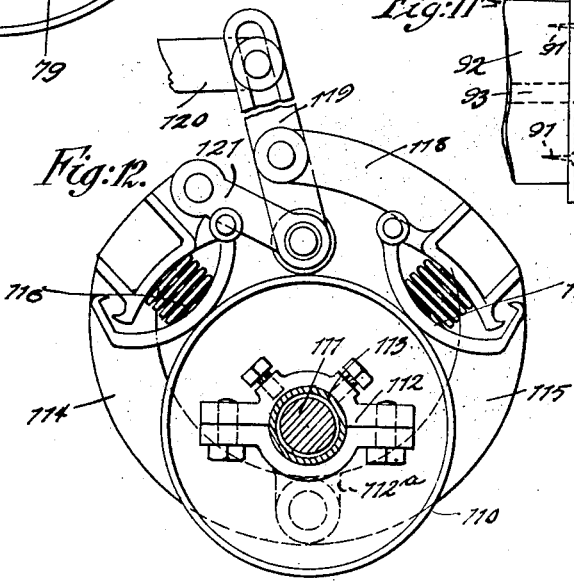
INVENTOR
George W. Kuenneth
BY
ATTORNEY

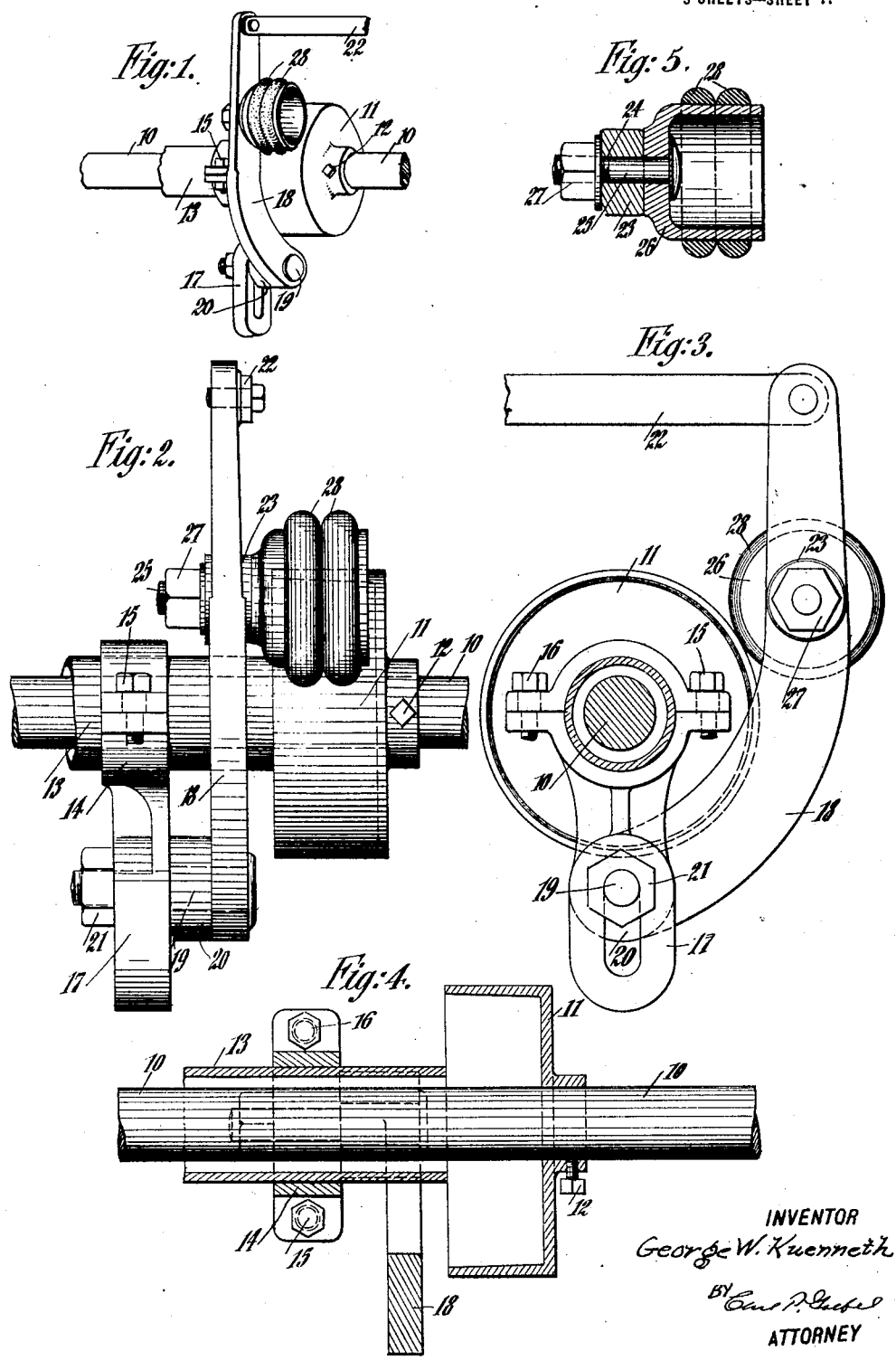

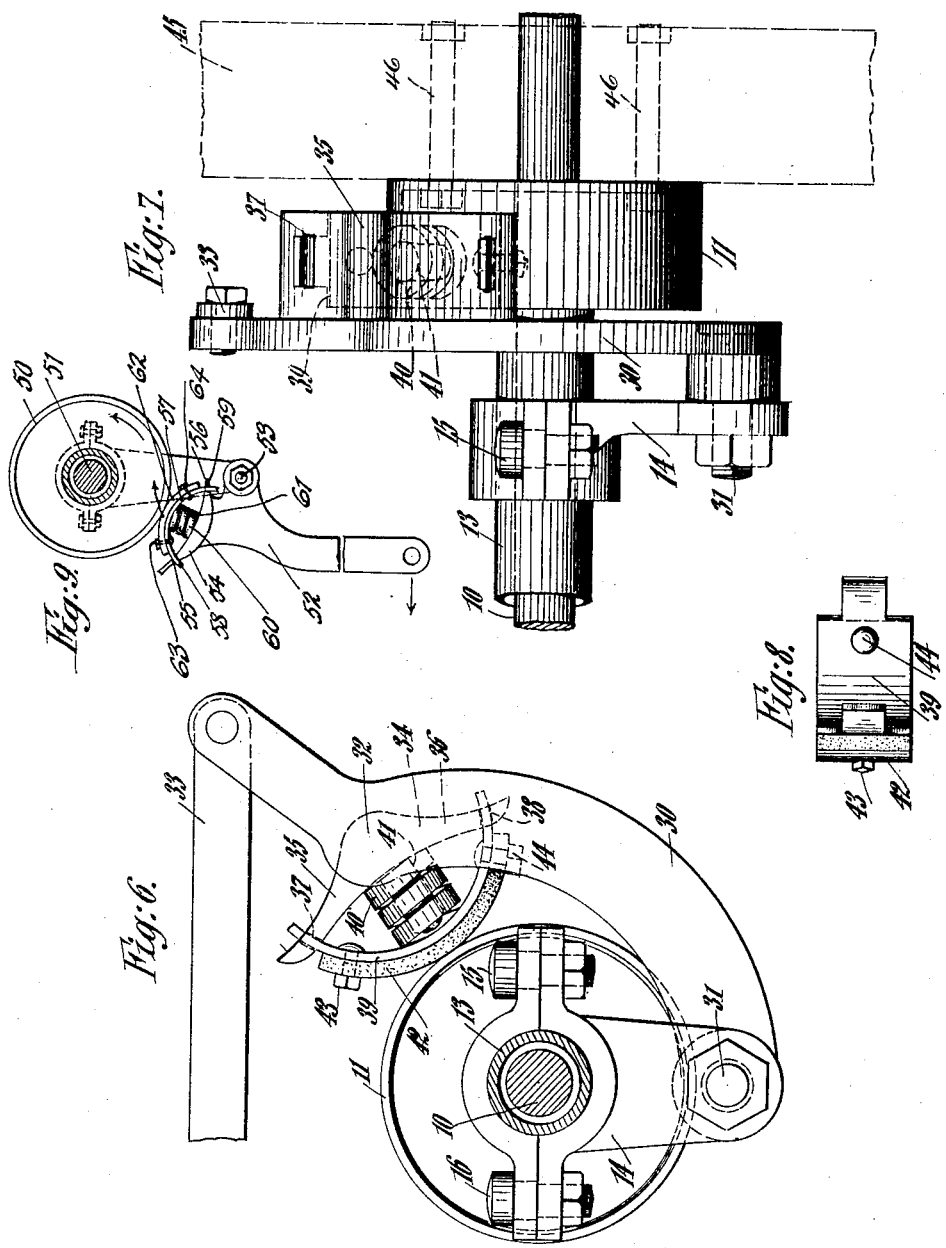

UNITED STATES PATENT OFFICE.

GEORGE W. KUENNETH, OF PATERSON, NEW JERSEY, ASSIGNOR TO JEANNETA KUENNETH, OF PATERSON, NEW JERSEY.

BRAKING DEVICE.

1,386,120. Specification of Letters Patent. Patented Aug. 2, 1921.

Application filed October 6, 1916. Serial No. 124,081.

*To all whom it may concern:*

Be it known that I, GEORGE W. KUENNETH, a citizen of the United States, and resident of Paterson, in the State of New Jersey, have invented certain new and useful Improvements in Braking Devices, of which the following is a specification.

The present invention relates to improvements in braking devices, and particularly to such a device for arresting the motion of a revoluble shaft, such shafts and brakes finding applications in numerous constructions such for instance as automobiles, looms, hydro-extractors, etc., where a strong and positive and flexible brake is desirable, and where simplicity of construction and operation are of importance. It is an object of the present invention, therefore, to provide such a brake which will be positive in its operation, simple in construction, durable and readily applicable to the structures in which its use is desirable.

With these and other objects in view, my invention is shown in the accompanying drawings, and will be hereinafter more fully described with reference thereto, and finally pointed out in the claims.

In the accompanying drawings,

Figure 1 is a perspective view of one form of my improved brake,

Fig. 2 is a front elevation of the same,

Fig. 3 is a side elevation thereof,

Fig. 4 is a transverse sectional view,

Fig. 5 is a sectional view of the braking element,

Fig. 6 is a side elevation of a modified form of construction,

Fig. 7 is a front elevation thereof,

Fig. 8 is a detail view of the braking element,

Fig. 9 is a side elevation of a further modified form of construction,

Fig. 10 shows a still further modified form in which the braking member is interiorly of the drum, Fig. 11 shows in side elevation my invention as applied to a driving mechanism, Fig. 11$^a$ is an end view thereof, Fig. 12 shows a compound brake embodying my invention.

Similar reference characters indicate corresponding parts throughout the several figures of the drawings.

Referring to the drawings, and more particularly to Figs. 1 to 5 thereof, the rotatable shaft 10 upon which may be provided the element to be braked, as for instance, a wheel, is provided with a drum 11, rigidly secured thereto by a set-screw 12, the said drum being in the form of a shell open at the inner side, and closed at the outer side. A cylindrical supporting member and shaft housing 13 surrounds the shaft in spaced relation therefrom, being supported stationary in any suitable manner. A hanger 14 is secured to the supporting member 13 by means of bolts and nuts 15 and 16, and is provided at its lower end with a bearing 17 in which is fulcrumed the lower end of a curved lever 18, a pin 19 passing through the enlarged bearing portion 20 of the lever and the bearing 17, and secured in place by a nut 21. The bearing member is slotted so that the fulcrum of the lever may be adjusted with respect to the shaft of the drum. The fulcrum of the lever, it will be noted, is immediately below the shaft 10, and the lever extends upwardly at one side of the drum, being provided at its upper end with a suitable rod 22, by which the lever may be manipulated from any suitable source. The fulcrum point may be at any point about the drum if desired.

Intermediately of the fulcrum of the lever and the upper end thereof, there is provided an enlarged bearing portion 23 having a hole 24 in which is provided a bolt 25, which rigidly and non-rotatingly secures a cylindrical shell 26 to the lever, the said shell being disposed at one side, and above the center of the drum 11. The bolt is held in place by a lock nut 27. A plurality of rubber rings 28 are non-rotatably mounted upon the periphery of the shell 26, being either of conical, semicircular or other such cross-section as to present a plurality of substantially pointed contact surfaces.

The shell 26 is in such position, it will be noted, that when the lever is moved on its fulcrum, the shell moves either to or from the drum 11 in an arc, eclipsing the periphery of the drum. When the shaft is to be stopped or arrested in its motion, therefore, the lever is drawn toward the drum, and an increasing pressure is brought to bear thereon, which acts in the nature of a wedge, the frictional grip of the rubber rings exerting a holding force on the drum, against any appreciable force on the shaft.

The rubber is affected but little by temperature or humidity, which is of great importance in brakes of this character. When the rings become worn at one point, they may be turned or shifted circumferentially of the shell 26 so as to bring another portion of the rubber into position, or the supporting shell itself may be rotatably adjusted after loosening the nut 27.

In Figs. 6 to 8 I have shown a modified form of construction, in which the shaft housing, drum and hanger are similar to that employed in the first form of my invention. The lever 30 is curved upwardly and outwardly from the fulcrum 31 at the side of the drum 11 and at a point 32 substantially 35° above the center of the shaft 10, the lever is straightened and extends in an inclined direction upwardly, where it is provided at its upper end with a manipulating rod 33.

At the point 32, and on the outer side of the lever, there is provided a stud 34 having flared arms 35 and 36, preferably formed integral with the lever, the said arms being provided at their ends with slots 37 and 38, in which the reduced ends of an arcuate brake shoe 39 are slidably disposed, a spring 40 and spring guide 41 being provided between the stud and the shoe in order to impart the necessary resiliency to the shoe. The shoe is faced with an asbestos covering 42 secured thereto by bolts 43 and 44, and which together with the resiliency of the shoe, has substantially the same effect as the rubber rings.

By movement of the lever 30 toward the drum, the shoe frictionally engages the same by a wedging action which arrests the movement of the shaft.

A wheel 45 shown in dotted lines in Fig. 7, may be secured to the drum 11 by suitable screws 46.

In Fig. 9 I have shown a further modification in which the eclipsing braking action shoes are placed at a different portion of the drum, namely at a point between the fulcrum of the lever and the axis of the drum.

The drum 50 is rotatably mounted upon a shaft 51, and the brake lever 52 is pivotally mounted at 53 upon a bracket extending from the shaft 51, or other suitable means of support may be provided. The brake lever is curved outwardly above and below the pivot point, the lower portion constituting the long arm of the lever which may be provided at its end with any suitable operating means, and the upper portion or short arm being provided with an arcuate plate 54, the face of which is concentrically arranged with respect to the drum. Slots 55 and 56 are provided in the ends of the plate 54, and a curved shoe 57 having reduced ends 58 and 59 similar to that shown in Figs. 6 to 8, is mounted at its reduced ends in the said slots, a spring 60 being disposed on a stub shaft 61 between the plate 54 and the shoe, to give the same the necessary resiliency. A facing 62 of asbestos, rubber or other suitable material, is secured to the shoe by bolts 63 and 64, and is adapted to be engaged with the periphery of the drum by movement of the lever, by an increasing force proportionate to the force exerted on the lever.

In the form of construction shown in Fig. 10, the braking element which is somewhat similar to that shown in Figs. 6 and 9, is applied to the inner side of the drum. The drum 70 is mounted upon the shaft 71 and a bracket 72, having an upwardly extending portion 73 is non-rotatably secured to the cylindrical supporting member 74 surrounding the shaft.

A lever 75 is fulcrumed to the portion 73 at 76, one arm of the same extending upwardly from the same, the other arm extending in a curved line around the shaft, and provided at its end with a portion 77 extending into the drum. The curved braking member 78, which is provided with an asbestos facing is hingedly secured at one end to the portion 77, and at the other end is provided with a hooked shape portion which extends above a lug 79 on the said portion 77.

A spring 80 is disposed between the member 78 and the portion 77, to give the necessary resiliency to the braking element. By pulling on the lever 75 in one direction, it will be seen, the braking element is brought to bear in an eclipsing direction upon the inner surface of the drum, thereby bringing about the braking action. This action is released by moving the lever in the other direction.

In Figs. 11 and 11ª I have shown my invention as embodied in a drive particularly intended for looms. The drum 90 is secured by screws 91 to the cylinder 92 to be driven, and upon which in a loom the woven material is wound. The shaft 93 of this cylinder is loosely mounted in the socket 94. This socket member 94 forms the end of a drive shaft 95 driven by a gear 96. A lever 97 is rigidly mounted on the shaft 95, one arm of which extends downwardly therefrom, and the other arm is curved upwardly and outwardly therefrom, being provided at its upper end with a hooked shaped portion 98. A curved lever 99 is pivotally secured at the lower end of the lever 97 by means of a suitable nut and bolt 100, and at its upper end is provided with a hook 101 which is connected by a spring 102 with the hooked portion 98 of the lever 97. A braking element is rigidly secured to the lever 99, comprising a shell 103 and a plurality of rubber rings 104, as in the first form of my invention, and in such position as to frictionally grip the periphery of the drum by a wedging action, occasioned by the eclipsing of the drum. It will be seen that in this way the drum and cylinder are driven, the gripping member being constantly held in engagement with the drum by the spring 102. Should the material being wound on the cylinder become taut, the gripping member will slide on the drum. In this way a perfect drive is provided for this class of work.

Fig. 12 illustrates the application of my invention to a compound brake. The drum 110 is mounted upon the shaft 111, and a supporting bracket 112 having a downwardly extending bearing 112$^a$ is secured to the cylindrical supporting member 113. A pair of curved arms 114, 115 are pivoted to the bearing 112$^a$, and extend upwardly at each side of the drum, and each provided with braking elements 116 and 117, similar to that shown in Fig. 10, engaging opposite sides of the drum, intermediately between the horizontal diameter and the perpendicular diameter. The arm 115 is provided with an extension 118 to which is pivotally secured a lever arm 119. The upper end of this arm is provided with an operating rod 120, and the lower end is connected by a link 121, with the arm 114. By pulling on the rod 120, the two braking elements are brought inwardly into contact with the drum, and in this way the braking action is brought about, both in the direction of travel of the drum and away from the direction of travel.

The braking action occasioned by my improved brake, will resist a very considerable force on the shaft, the amount of force exerted on the brake being inconsiderable, and such as might be imparted by an ordinary foot lever.

I have illustrated and described preferred and satisfactory forms of my invention, but it is obvious that changes may be made therein within the spirit and scope thereof, as defined in the appended claims.

I claim:

1. A device of the class described, comprising a stationary tubular shaft housing, a shaft extending through said housing axially but out of contact therewith, a member held to rotate with the shaft and carried thereby exteriorly of said housing, a hanger carried by said housing, a lever fulcrumed on said hanger, and a friction member carried by said lever and adapted for engagement with said rotary member.

2. A device of the class described comprising a stationary tubular shaft housing, a shaft extending through said housing axially but out of contact therewith, a drum held to rotate with the shaft and carried thereby exteriorly of said housing, said drum being formed as a shell open toward said housing and closed on the other side, a lever pivotally connected with said housing, and a friction member carried by said lever and adapted for engagement with said drum and disposed eccentrically thereto.

3. A device of the class described, comprising a stationary tubular shaft housing, a shaft extending through said housing axially but out of contact therewith, a member held to rotate with said shaft and carried thereby exteriorly of said housing, a fulcrum carried by said housing and adjustable toward and from said shaft, a lever mounted to swing on said fulcrum and a friction member carried by said lever and adapted for engagement with said rotary member.

4. A device of the class described, comprising a rotary member, a lever mounted to swing about a stationary axis adjacent to said member, and a friction member provided with a plurality of spaced contact surfaces adapted for engagement with said rotary member in different planes of rotation, said friction member being adjustable in a plane substantially parallel with the axis of said rotary member, whereby contact may be effected between the drum and different portions of said contact surfaces.

In testimony that I claim the foregoing as my invention, I have signed my name in presence of two subscribing witnesses.

GEORGE W. KUENNETH.

Witnesses:
THEMIS MATTEN,
MOE WEINBERG.